(12) United States Patent
Wen et al.

(10) Patent No.: US 11,811,614 B2
(45) Date of Patent: *Nov. 7, 2023

(54) ASSIGNING ROUTING PATHS BASED ON INTERIOR GATEWAY PROTOCOL METRIC OPTIMIZATION

(71) Applicant: Google LLC, Mountain View, CA (US)

(72) Inventors: Min Wen, Sunnyvale, CA (US); Wenjie Jiang, Fremont, CA (US); Anurag Sharma, Cupertino, CA (US); Matthew Johnston, Palo Alto, CA (US); Rodolfo Enrique Alvizu Gomez, San Jose, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/175,127

(22) Filed: Feb. 27, 2023

(65) Prior Publication Data

US 2023/0208720 A1 Jun. 29, 2023

Related U.S. Application Data

(63) Continuation of application No. 17/323,464, filed on May 18, 2021, now Pat. No. 11,601,336.

(51) Int. Cl.
*H04L 12/28* (2006.01)
*H04L 41/12* (2022.01)
*H04L 41/14* (2022.01)
*H04L 45/02* (2022.01)

(52) U.S. Cl.
CPC ............. *H04L 41/12* (2013.01); *H04L 41/14* (2013.01); *H04L 45/02* (2013.01); *H04L 45/08* (2013.01)

(58) Field of Classification Search
CPC ......... H04L 41/12; H04L 41/14; H04L 45/02; H04L 45/08
USPC ........................................... 370/254; 709/220
See application file for complete search history.

(56) References Cited

U.S. PATENT DOCUMENTS

| | | | |
|---|---|---|---|
| 7,023,808 B2 | 4/2006 | Ball et al. | |
| 7,581,022 B1 * | 8/2009 | Griffin | ................. H04L 45/123 709/241 |
| 7,903,573 B2 | 3/2011 | Singer et al. | |
| 7,904,586 B1 | 3/2011 | Griffin et al. | |
| 8,320,255 B2 | 11/2012 | Vasseur et al. | |
| 8,700,801 B2 | 4/2014 | Medved et al. | |

(Continued)

OTHER PUBLICATIONS

Valadarsky et al., A Machine Learning Approach to Routing, Nov. 11, 2017, arXiv: 1708.03074v2 (Year: 2017).

(Continued)

*Primary Examiner* — Hee Soo Kim
(74) *Attorney, Agent, or Firm* — Lerner David LLP

(57) ABSTRACT

Methods, systems, and apparatus, including computer-readable storage media, optimizing interior gateway protocol (IGP) metrics using reinforcement learning (RL) for a network domain. The system can receive a topology (G) of a network domain, a set of flows (F), and an objective function. The system can optimize, using reinforcement learning, the objective function based on the received topology and the one or more flows F. The system can determine updated IGP metrics based on the optimization of the objective function. The IGP metrics for the metric domain may be updated with the updated IGP metrics.

20 Claims, 6 Drawing Sheets

(56) References Cited

U.S. PATENT DOCUMENTS

| | | |
|---|---|---|
| 9,847,939 B2 | 12/2017 | Patel et al. |
| 10,097,449 B2 | 10/2018 | Patel et al. |
| 10,305,780 B1 | 5/2019 | Chandrashekaran et al. |
| 10,541,905 B2 | 1/2020 | Patel et al. |
| 10,958,559 B2 | 3/2021 | Ansari et al. |
| 2013/0232193 A1* | 9/2013 | Ali .................. H04L 67/00 709/203 |
| 2014/0222728 A1 | 8/2014 | Vasseur et al. |
| 2016/0021010 A1 | 1/2016 | Vasseur et al. |
| 2019/0268234 A1 | 8/2019 | Cheng et al. |
| 2020/0036624 A1 | 1/2020 | Michael et al. |
| 2020/0403902 A1 | 12/2020 | Saad et al. |
| 2021/0119882 A1 | 4/2021 | Orhan et al. |

OTHER PUBLICATIONS

Extended European Search Report for European Patent Application No. 22155024.7 dated Aug. 2, 2022. 9 pages.

\* cited by examiner

ASSIGNING ROUTING PATHS BASED ON INTERIOR GATEWAY PROTOCOL METRIC OPTIMIZATION

CROSS-REFERENCES TO RELATED APPLICATIONS

The present application is a continuation of U.S. patent application Ser. No. 17/323,464, filed on May 18, 2021, the disclosure of which is hereby incorporated herein by reference.

BACKGROUND

In layer 3 (L3) networks, Interior Gateway Protocol (IGP) metrics are commonly used to assign routing paths between nodes on a network domain. In a typical system, network managers compute a baseline IGP metric for each link between nodes. Such baseline IGP metrics may be based on measured round-trip time (RTT) for data traversing the links between the nodes. Depending on the baseline IGP metrics for each link, routing paths between nodes, which many include one or more links, may be determined. Inefficient assignments of routing paths based on IGP metric values can cause operation of the network domain to operate inefficiently and in some instances, cause the network domain to not meet service level objectives (SLOs), such as maintaining latency below a particular level. In such situations, the baseline IGP metrics may be manually overwritten when assigned routing paths are determined to be inefficient or when other such issues are identified.

Network managers typically use their discretion to identify and overwrite IGP metrics of links between nodes to address network inefficiencies or failures and to meet SLOs. Typically, network managers need to analyze the routing results at the steady-state, when everything in the network domain works as expected but also at various failure states, when some components in the network domain fail. Due to the large number of links and failure states, it is extremely challenging, and in some instances not possible, to evaluate and decide optimal IGP metrics to overwrite while considering all possible failure states. Thus, in practice, IGP metric overwrites usually result from local analysis with only a few failure states. Additionally, network managers typically have no ability to evaluate the quality of a given set of IGP metrics absent implementing them. As a result, the proposed IGP metrics are usually not optimal. Poor IGP metrics can lead to various issues, such as elevated network failure risk, latency, poor user experience, and higher network build costs.

Moreover, the baseline IGP metrics are generally correlated with latency. In this regard, links assigned with baseline IGP metrics indicative of low latency are often selected for routing paths as they likely correspond to the shortest, and thus quickest paths on the network. However, baseline IGP metrics based on latency do not work well in all network settings. In this regard, many properties other than latency can contribute to the decision on the best routing paths for a network. For instance, a path between a source node and destination node may have the lowest latency but may also have the highest failure probability and/or limited bandwidth capabilities that are detrimental to data transmission on the network domain. As IGP metrics are not typically correlated with properties such as failure probability and capacity, the baseline IGP metrics cannot account for these properties.

BRIEF SUMMARY

The present disclosure relates to optimizing interior gateway protocol (IGP) metrics using reinforcement learning (RL). An IGP metric optimizer may optimize IGP metrics with respect to any deterministic network-based optimization objective function. The inputs to the IGP metric optimizer may be the network cross-layer topology, a list of demands, a set of probabilistic failures and a subset of links to tune. The IGP metric optimizer may use RL to optimize the objective function to determine an updated set of IGP metrics based on the inputs. The updated set of IGP metrics may then be used to assign routing paths between nodes for a network domain.

One aspect of the disclosure provides a method for tuning IGP metrics for a network domain. The method includes receiving, by one or more processors, a topology (G) of a network and a set of flows (F); receiving, by the one or more processors, an objective function; and optimizing, by the one or more processors using reinforcement learning, the objective function based on the received topology and the one or more flows F.

Another aspect of the disclosure provides a system comprising one or more processors. The one or more processors are configured to receive a topology (G) of a network domain and a set of flows (F); receive an objective function; and optimize, using reinforcement learning, the objective function based on the received topology and the one or more flows F.

Yet another aspect of the disclosure provides a non-transitory computer readable medium storing instruction, that when executed by one or more processors, cause the one or more processors to: receive a topology (G) of a network domain and a set of flows (F); receive an objective function; and optimize, using reinforcement learning, the objective function based on the received topology and the one or more flows F.

In some instances, the topology G equals (V, E), where V is a set of nodes on the domain network and E is the set of edges between each node in the set of nodes on the domain network.

In some instances, each of one or more flows F equals $\{f\_j\}$, $j=1 \ldots |F|$, where j is the index of the flow and each flow f_j is a tuple comprising (src_j, dst_j, demand_j, SLO_j), where src_j and dst_j are the source and destination node, respectively, demand_j is the size of the flow, and SLO_j is the service level objective (SLO) requirement for the flow.

In some instances, a network utility is determined by a routing simulator for each failure state. In some examples, optimizing the objective function is further based on the network utility of each failure state determined by the routing simulator.

In some instances, updated IGP metrics are determined based on the optimization of the objective function. In some examples, the IGP metrics for the network domain are updated with the updated IGP metrics.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Overview

The technology described herein address the deficiencies of known techniques for identifying and overwriting IGP metrics, by identifying and overwriting IGP metric values with values that improve network performance determined by optimizing an objective function formulated as a reinforcement learning problem solvable by an IGP metric optimizer. The IGP metric optimizer is a framework that is configured to optimize the given objective function by tuning the IGP metrics of given links. The updated set of IGP metrics may then be used to assign routing paths between nodes for a network domain.

The technology described herein is advantageous because it provides an end-to-end solution that can automatically tune IGP metrics to optimize an arbitrary objective function for an arbitrary pair of network topology, network states, including failure states, demands, and policies. Moreover, the technology provides the ability to handle many objective functions. For example, traditional optimization-based formulation requires explicit mathematical expressions of the objective function, dynamics function, constraint functions, etc., leading to problems that are so complex, that current systems are unable to consider many failure states at the same time. The IGP metric optimizer is capable of handling large numbers of failure states, learn from previous training experiences, and accelerate training in future tasks.

Example Systems and Architectures

Figure 1:
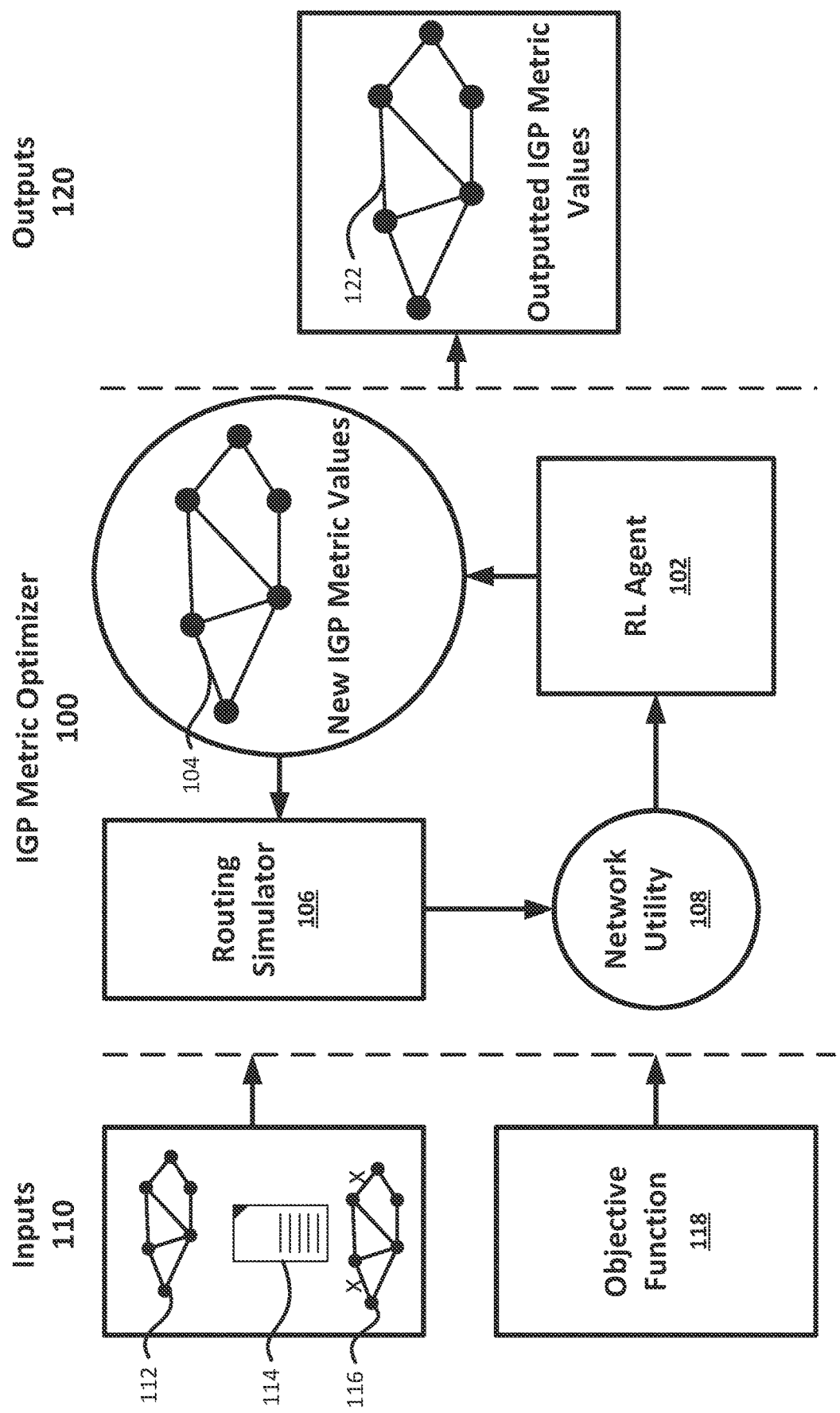
FIG. 1 is a block diagram that illustrates an architecture of an IGP metric optimizer according to aspects of the disclosure.

FIG. 1 illustrates an example software architecture and dataflow of an IGP metric optimizer 100. As shown, the software architecture includes a routing simulator 106 and reinforcement learning (RL) agent 102. The IGP metric optimizer 100 receives a set of inputs 110. The inputs may include network topology 112 of a network domain, demands 114, probable failure states 116 of the links connecting nodes in the network domain, and an objective function 118. Although not shown, the inputs 110 may include a subset of links within the network topology to tune. Based on some or all of the inputs 110, the routing simulator 106 may determine a network utility 108 for a set of flows and network topology at some or all failure states. The RL agent 102 may use the determined network utilities along with the inputs 110 to optimize the objective function 118 to determine updated IGP metric values 104.

The updated IGP metric values may be provided to the routing simulator 106 which may determine an updated network utility based on the updated IGP metrics. Based on the updated network utility the RL agent 102 may optimize the objective function 118 to determine a new set of updated IGP metric values. This process may continue indefinitely, with the routing simulator 106 determining updated network utility values and the RL agent 102 determining new, updated IGP metric values. The process may be stopped by a network manager or other user of the IGP metric optimizer 100, such as when the network manager determines the updated IGP metric values are good enough. Alternatively, the process may be stopped after a predetermined number of runs, a predetermined time period, after the change to updated IGP metric values between runs is below a threshold value, etc. The final set of updated IGP metric values may be output by the IGM metric optimizer 100, illustrated as the outputted IGP metric values 122 in FIG. 1. The outputted IGP metric values may be used to assign routing paths between nodes in the network domain.

Figure 2:
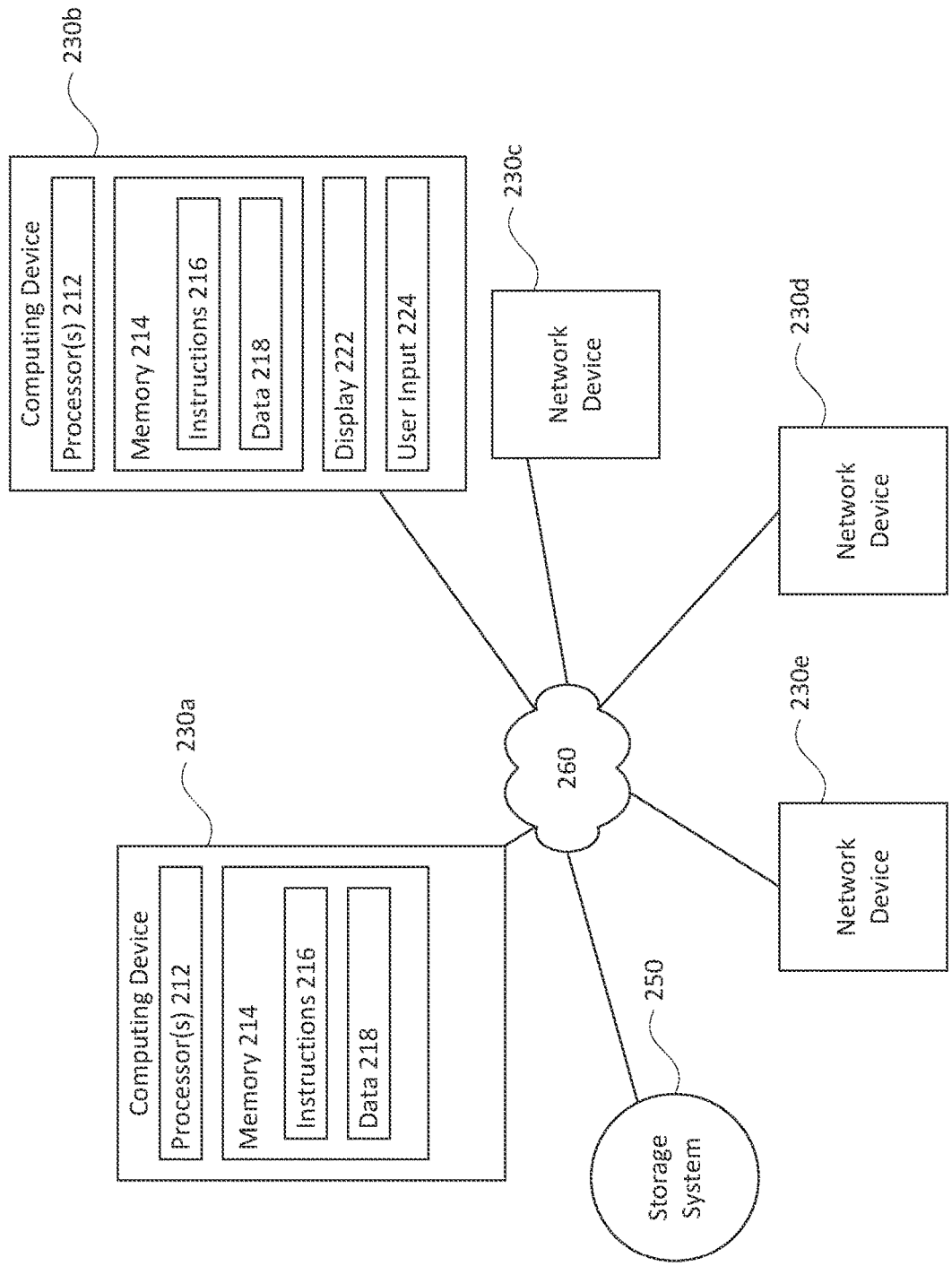
FIG. 2 is an example system capable of implementing the IGP metric optimizer according to aspects of the disclosure.

FIG. 2 illustrates an example system 200 including network devices for performing aspects of the present disclosure. The system 200 includes network devices 230a-230e (collectively "network devices 230"), including computing devices 230a and 230b. All network devices may be communicatively coupled to a network 260.

The network devices 230, such as network devices 230c-230e may include switches, routers, modems, gateways, software-defined-network applications, or other such components that may be connected to or otherwise form part of the network 260. The network devices 230 may include physical devices, virtualized devices, replicas, etc. In some examples, network devices may include computing devices such as servers, general purpose computers, PDAs, tablets, mobile phones, smartwatches, terminals, set top boxes, and other such devices. For instance, and as further illustrated in FIG. 2, network devices 230a and 230b are computing devices. In another example, network device 230c may be a top-of-rack switch that has a set of servers attached to it. In yet another example, network device 230d may be a router that is attached to a plurality of switches, which in turn connect to a plurality of computing devices. Additionally, network devices 230 may also include services that are implemented on the network devices. Although FIG. 2 illustrates only network devices 230a and 230b as computing devices, the system 200 can include any number of computing devices. Moreover, although only network devices 230a-230e are illustrated in system 200, the system may include any number of network devices.

Although FIG. 2 illustrates the network devices 230a-230e as being connected directly to the network 260, the network devices may be connected to the network 260 via other network devices. For instance, network devices 230a and 230b may be connected to the network 260 through another network device, such as one of network devices 230c-230e. Similarly, network devices 230c-230e may be connected to the network 230 via other network devices.

Figure 3:
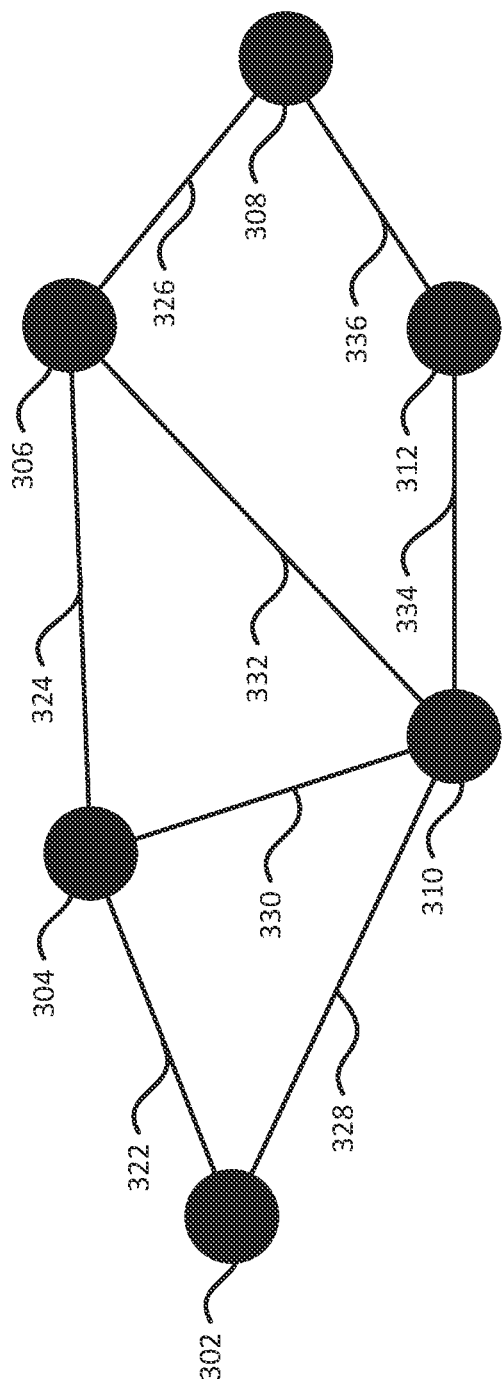
FIG. 3 is an illustration of a domain network in accordance with aspects of the disclosure.

Network devices 230 may be coupled to other network devices to form a link on a communication pathway on the network 260. For example, a first network device may connect to a second network device, which may connect to other network devices or directly to the network. FIG. 3 illustrates an example network domain 300 including network devices 302-312, also referred to herein as nodes. The nodes may be connected by edges 322-336, also referred to herein as links. For example, node 302 is connected to node 308 via links 322, 324, and 326, with link 322 being between nodes 302 and 304, link 324 being between nodes 304 and 306, and link 326 being between nodes 306 and 308. In some instances, nodes may be connected via multiple paths. For instance, node 302 is illustrated as being connect to node 308 via another including links 328, 332, and 326, with link 328 being between nodes 302 and 310, link 332 being between nodes 310 and 306, and link 326 being between nodes 306 and 308. The routing path selected between nodes may be based on updated IGP metrics, as described further in.

A network domain may include a collection of network devices, such as network devices 230, referred to herein as "nodes," that share a common domain. In some instances, a network domain may include a domain and one or more sub-domains. Each domain and sub-domain may be under common control by one or more administrators.

Network devices may include components typically present in general purposes computers, servers, and routers. For instance, and as further illustrated in FIG. 2, network device 230a is a computing device containing a processor 212 and memory 214. The memory 214 can store information accessible by the processor 212, including instructions 216 that can be executed by the processor 212. Memory 214 can also include data 218 that can be retrieved, manipulated or stored by the processor 212. The memory 214 may be a type of non-transitory computer readable medium capable of storing information accessible by the processor 220, such as a hard-drive, solid state drive, flash drive, tape drive, optical storage, memory card, ROM, RAM, DVD, CD-ROM, write-capable, and read-only memories. The subject matter disclosed herein may include different combinations of the foregoing, whereby different portions of the instructions 216 and data 218 are stored on different types of media. The processor 212 can be a well-known processor or other lesser-known types of processors. Alternatively, the processor 112 can be a dedicated controller such as an ASIC.

The instructions 216 can be a set of instructions executed directly, such as machine code, or indirectly, such as scripts, by the processor 212. In this regard, the terms "instructions," "steps" and "programs" can be used interchangeably herein. The instructions 216 can be stored in object code format for direct processing by the processor 220, or other types of computer language including scripts or collections of independent source code modules that are interpreted on demand or compiled in advance. The instructions 216 may provide for implementing an IGP metric optimizer, such as IGP metric optimizer 100, including RL agent 102 and routing simulator 106, as described herein.

The data 218 can be retrieved, stored or modified by the processor 212 in accordance with the instructions 216. For instance, although the system and method are not limited by a particular data structure, the data 218 can be stored in computer registers, in a distributed storage system as a structure having a plurality of different fields and records, or documents, or buffers. The data 218 can also be formatted in a computer-readable format such as, but not limited to, binary values, ASCII or Unicode. Moreover, the data 218 can include information sufficient to identify relevant information, such as numbers, descriptive text, proprietary codes, pointers, references to data stored in other memories, including other network locations, or information that is used by a function to calculate relevant data.

Although FIG. 2 functionally illustrates the processor 212 and memory 214 as being within the same block, it will be understood by those of ordinary skill in the art that the processor and memory may actually comprise multiple processors and memories that may or may not be stored within the same physical housing. For example, some of the instructions and data may be stored on removable CD-ROM and others within a read-only computer chip. Some or all of the instructions and data may be stored in a location physically remote from, yet still accessible by, the processor. Similarly, the processor may actually comprise a collection of processors that may or may not operate in parallel.

Computing device 230b, and any other network devices, may be configured similarly to computing device 230a. In this regard, computing device 230b may have some or all of the same components of computing device 230a. For example, computing device 230b includes a processor 212 and memory 214 storing instructions 216 and data 218. Moreover, computing device 230b may include other components normally found in a personal computer such as a CD-ROM/DVD/Blu-ray drive, hard drive, and a display device 222, for example, a monitor having a screen, a projector, a touch-screen, a small LCD screen, a television, or another device such as an electrical device that can be operable to display information processed by a processor, speakers, a modem and/or network interface device, user input 224, such as a mouse, keyboard, touch screen or microphone, and all of the components used for connecting these elements to one another. Other computing devices and network devices in accordance with the systems and methods described herein may be configured similar to computing devices 230a and 230b.

The components in system 200, including network devices 230a-230e and storage system 250, may be capable of direct and indirect communication such as over network 260. For example, using a network socket, the network device 230a can communicate with another network device attached to network 260, through an Internet protocol. The network devices 230a-230e can set up listening sockets that may accept an initiating connection for sending and receiving information. The network 260 itself can include various configurations and protocols including the Internet, World Wide Web, intranets, virtual private networks, wide area networks, local networks, private networks, collections of private networks, such as a network domain, etc., using general communication protocols and/or communication protocols proprietary to one or more companies. The network 260 can support a variety of short- and long-range connections. The short- and long-range connections may be made over different bandwidths, such as 2.402 GHz to 2.480 GHz (commonly associated with the Bluetooth® standard), 2.4 GHz and 5 GHz (commonly associated with the Wi-Fi® communication protocol); or with a variety of communication standards, such as the LTE® standard for wireless broadband communication. The network 260, in addition or alternatively, can also support wired connections between the devices 260a-260e, as well as with the storage system 250, including over various types of Ethernet connection.

As described herein, aspects of the disclosure can be implemented according to a variety of different configurations and quantities of computing devices, including in paradigms for sequential or parallel processing, or over a distributed network of multiple devices. Moreover, aspects of this disclosure can be implemented in digital circuits, computer-readable storage media, as one or more computer programs, or a combination of one or more of the foregoing. The computer-readable storage media can be non-transitory, e.g., as one or more instructions executable by a cloud computing platform and stored on a tangible storage device.

For example, the IGP metric optimizer 100 may be implemented by multiple computing devices, such as computing devices 230a and 230b. For example, computing device 230a may implement the RL agent 102 and computing device 230b may implement the routing simulator. In other examples, inputs 110 may be provided by computing devices 230a, 230b, and/or some other network device or storage system. In some instances, the IGP metric optimizer may be implemented by one or more computing devices not connected to the network.

Example Methods

The IGP metric optimizer 100 may receive a set of inputs 110, as shown in FIG. 1. The routing simulator 106, within the IGP metric optimizer 100, may determine a network utility 108 for a set of flows and network topology at some or all failure states. The RL agent 102 may use the determined network utilities along with the inputs 110 to optimize the objective function 118 to determine updated IGP metric values 104. This process may repeat, with the updated IGP metric values may be provided to the routing simulator 106. The routing simulator may determine an updated network utility for each link based on the updated IGP metrics. Using these updated IGP metrics, the RL agent 102 may optimize the objective function 118 again to determine a new set of updated IGP metric values. Upon completion of the process, the IGP metric optimizer 100 may output IGP metric values that can be used to assign routing paths between nodes in the network domain.

The IGP metric optimizer 100 may operate by solving the following Problem 1, as outlined below.

Given:
(1) a topology of a network domain G=(V, E) where V is the set of nodes and E is the set of edges, also referred to herein as links between nodes;
(2) a set of flows F={f_j} j=1 . . . |F|, where j is the index of the flow and each flow f_j is a tuple comprising (src_j, dst_j, demand_j, SLO_j), where src_j and dst_j are the source and destination node of this flow, respectively, demand_j is the size of the flow measured in Gbps, and SLO_j is the SLO requirement for the flow; and
(3) an objective function u that maps any G, F, and IGP metric to its network utility, the IGP metric optimizer may optimize the objective function u over all IGP metrics given the topology G and the set of flows F to determine an optimal positive-integer-valued IGP metric ($IGP_O$) that maximizes network utility. (Problem 1)

Network utility may include any type of measure of the network and its configuration, such as transient risks, network steady-state risks, and user experience. In one example, network utility may include how much flow is unrouted at each failure state. In another example, network utility may include how much flow will be dropped or violate its routing policy shortly after a failure occurs.

The IGP metric optimizer 100 outputs an $IGP_O$ for each link. The outputted $IGP_O$ for each link may be provided to the routing simulator 106 to simulate the implementation of the $IGP_O$ metrics. In this regard, the routing simulator 106 may use the $IGP_O$ to get routing results, such as paths and demand routed in each path, for any given flow or any set of flows, at any given failure state. The routing simulator 106 may output routing paths for each flow at some or all states, including steady-state and failure states.

Although each flow f_j in the set of flows F is described as comprising a tuple including elements src_j, dst_j, demand_j, and SLO_j, the tuple may include more or fewer elements. Additionally, although demand_j is described as being the flow size measured in Gbps, the flow may be measured in any metric, such as MBps, mbps, etc. An example flow may include a network node in San Francisco (the source node), a node in New York City (the destination node). The demand of the flow may be 100 Gbps and the SLO may be 99.99% availability. There may not be any direct link or adjacency between the nodes in San Francisco and New York, so the flow may traverse multiple links on the network to route from the node in San Francisco to the node in New York City.

The topology G and set of flows F are typically known and provided as inputs, such as inputs 110, to the IGP metric optimizer 100. However, when IGP metrics are also considered as optimization variables, determining an objective function u for the IGP metric optimizer 100 may be difficult. In this regard, it may be difficult to find a satisfactory objective function because of the complexity of the problem. For example, the size of the network, the number of flows, and the number of failure states all add complexity to the problem. Moreover, there may be many different types of network utilities that a network manager wants to encode into the objective function, but it may only be possible to solve for a single scalar objective function. Further yet, each objective function has to be modeled and designed, which may itself be difficult.

Once an objective function is developed, the objective function may be used to evaluate routing results. Thus its value depends directly on routing results and indirectly on IGP metrics. A routing result specifies the amount of traffic that goes through each feasible routing path for all the flows F in topology G. Typically, all the feasible routing paths should be used to minimize the amount of unrouted demand. However, the number of feasible routing paths grows exponentially with the number of edges E. Further, the number of possible failure states grows exponentially as topology G grows. Thus, evaluating all feasible routing paths and failure states through the objective function can require large amounts of memory and processing power. The IGP metric optimizer 100, which includes an RL agent 102 described herein, may be used to optimize a wide range of objective functions, so long as their values can be determined by the IGP metrics of all the links. Such objective functions may include deterministic objective functions. Accordingly, the same IGP metric optimizer can be used to solve a wide range of optimization problems.

The IGP metric optimizer 100 may include a routing simulator 106 and an RL agent 102, as shown in FIG. 1. The routing simulator 106 may be considered a black box that takes IGP metric configurations as inputs and gives network utilities as outputs. The RL agent 102 keeps a value function that predicts the quality of any given IGP metric, and a policy that decides the next IGP metric to sample. As training goes on, the RL agent 102 collects more IGP metrics and observes their respective network utilities. Based on the collected IGP metrics and their respective network utilities, the RL agent 102 can update its value function and policy, and increase the likelihood to sample IGP metrics with more favorable network utilities.

To train the RL agent, a routing simulator that can deterministically return a routing result for any given topology G of a network domain, a set of Flows F, and IGP metric may be used, as further shown in FIG. 1. Accordingly, Problem 1 can be modified into Problem 2, where when given:
(1) a topology of a network domain G=(V, E) where V is the set of nodes and E is the set of edges;
(2) a set of flows F={f_j} j=1 . . . |F|, where j is the index of the flow and each flow f_j is a tuple comprising (src_j, dst_j, demand_j, SLO_j), where src_j and dst_j are the source and destination node of this flow, respectively, demand_j is the size of the flow measured in Gbps, and SLO_j is the SLO requirement for the flow;
(3) a routing simulator f that maps any G, F, and IGP metric to the corresponding routing result f(G, F, IGP);
(4) an objective function u that maps any routing result f(G, F, IGP) to its network utility;

the IGP metric optimizer may optimize the objective function for an optimal positive-integer-valued IGP metric ($IGP_O$) that maximizes u(f(G, F, IGP)) over all IGP metrics.

Figure 4:
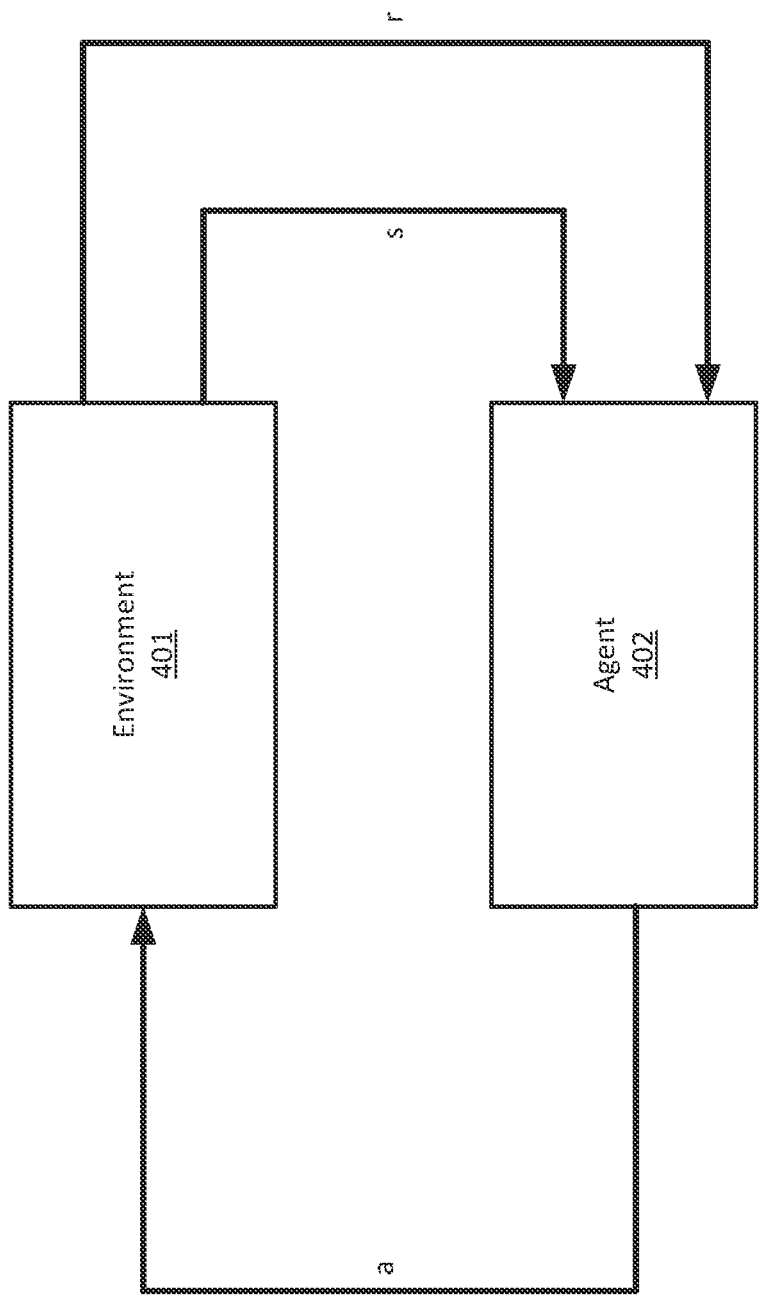
FIG. 4 is an illustration of the interaction between an environment and agent according to aspects of the disclosure.

For the IGP metric optimizer 100, the IGP metric generation process may be modeled as a Markov decision process (MDP) and optimized by an RL agent, such as RL agent 102. There are two components for a standard RL problem including an environment 401 and an agent 402. The environment 401 and agent 402 interact with each other, as shown in FIG. 4. In this regard, the environment 401 tracks its current state 's', takes state transitions in response to the agent's actions, and gives reward feedback 'r' to the agent 402. 402 The agent observes the environment's state and takes actions 'a' in the environment 401. The agent 402 and environment 402 typically interact for multiple steps, which can be either finite or infinite. The objective is to find a policy for the agent 402, which is a mapping from environment states to distributions over agent actions, that maximizes the expected total (or discounted) reward (referred to herein as utility,) throughout the interaction.

The interaction between an environment 401 and the agent 402 may be modeled as a MDP M=(S, A, T, R, γ), where: S is a set of states, A is a set of actions, T: S×A→D(S) is a mapping from state-action pairs to distributions over the next state, R: S×A→R, is a mapping from state-action pairs to reward values; and γ is a discount factor, typically between 0 and 1. When solving the RL problem, the goal is to find a policy that maps from states to action π: S→(A) distributions, that maximize the expected discounted reward:

Note that when γ=1 objective J is the expected total reward.

As explained above, the IGP metric generation process may be modeled as an MDP and the goal of the RL agent 102 is to find a policy to maximize the expected reward, or utility, when interacting with the MDP. In this regard, the objective function may be part of the reward function of the MDP. The interaction between the environment 401 and the agent 402, which may be compared to RL agent 102, is modeled as an MDP. A complete set of IGP metrics may be generated in multiple steps. At each step, the agent 402 may observe its current state, which includes the already-decided IGP metrics, and determine an action to take. Each action taken by the agent may decide the IGP metric of one link. After the agent 402 takes its action, the MDP may respond by transiting the current state to another one that includes the newly decided IGP metric. The environment 401 may send a reward signal to the RL agent. After multiple steps, when all the links get IGP metrics, the reward will be the network utility for the newly generated IGP metric. Before that, the reward at each step is 0.

Figure 5:
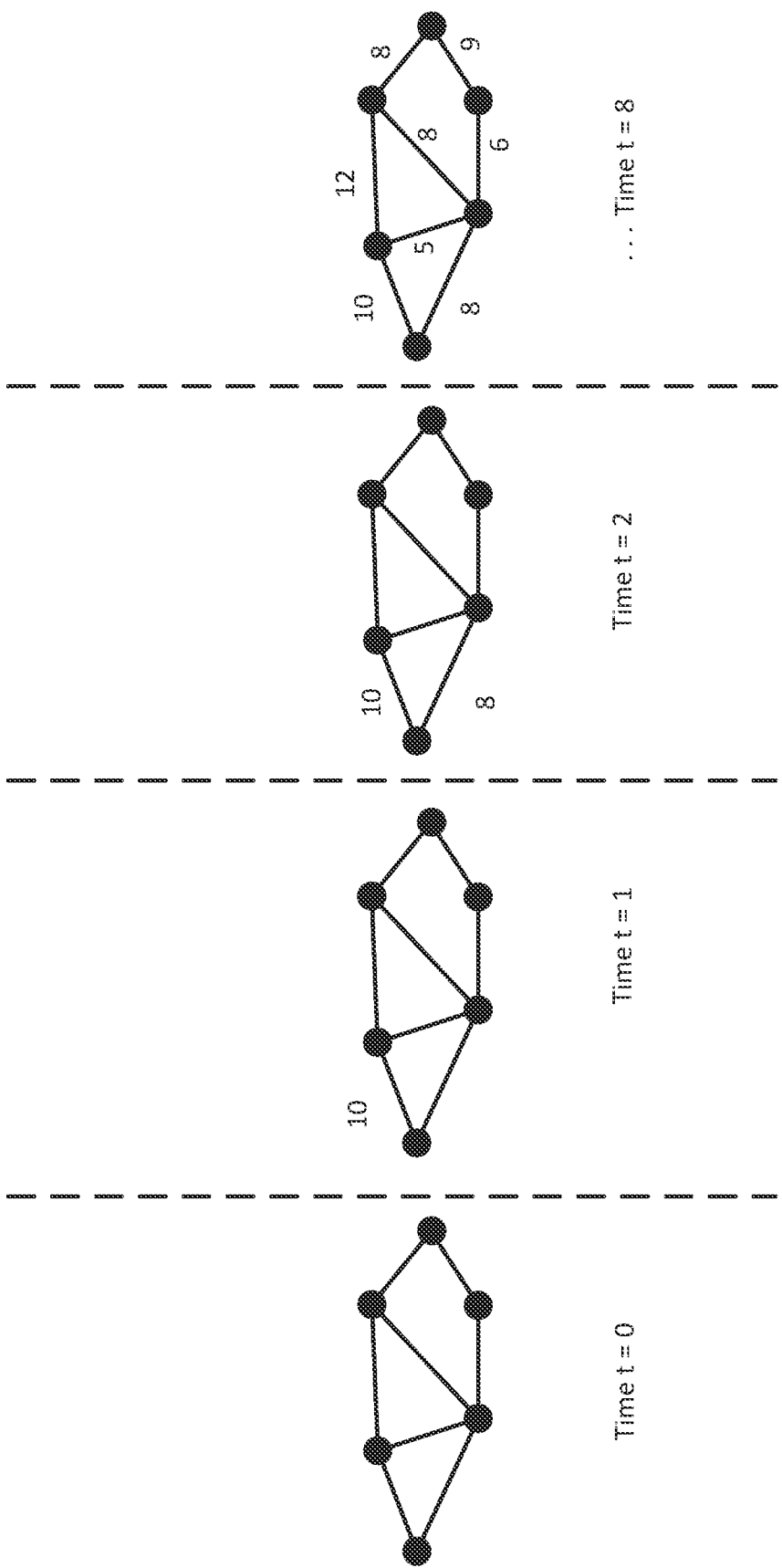
FIG. 5 is an example of determining utility values according to aspects of the disclosure.

In an implementation, each link on a network may be assigned an index. Then for each link, an IGP metric value may be assigned in the same order as the link indices. The procedure for generating IGP metrics is illustrated in FIG. 5. FIG. 5 illustrates an IGP metric generation procedure for an 8-link network topology across nine steps. In the first 8 steps, the RL agent, such as RL agent 102 of the IGP metric optimizer 100, generates the IGP metric of one link at each step. In the last step, the RL agent evaluates the whole IGP metric using the objective function.

In step 1, corresponding to time t=0, the network utility for all links is 0. At step 1, corresponding to time t=1, the IGP metric for a first link is determined to be 10. At step 2, corresponding to time t=1, an IGP metric for a second link is determined to be 8. This process continues, with an IGP metric being found for each link through time t=7 at step 8. At step 9, corresponding to time t=8, the IGP metrics of all links is determined, as further shown in FIG. 5. After determining a complete set of IGP metrics, the network utility may be evaluated. For clarity, not all steps are illustrated.

The interpretation of each component in the MDP for the IGP metric optimizer is as follows:

State: Each state contains all the IGP metrics that have been specified in previous steps; it also determines the next link to be assigned an IGP metric, given the fixed link indices.

Action: Each action at the current state specifies a different IGP metric for the next link.

State transition: Given a state and an action, the next state is (deterministically) decided by setting the IGP metric of the next link according to the action.

Reward: The reward is 0 if not all links get an IGP metric; otherwise the reward is the network utility with the generated IGP metrics, the given topology and the given demand;

Discount factor: γ=1 as we are maximizing the network utility of the generated IGP. Note that the process terminates after all the links get their IGP metrics, so the total reward throughout the interaction is finite if the network utility function is bounded.

Any deterministic function may be used as an objective function. However, a proper network utility function may increase the success of RL-based optimization. In this regard, the objective function is typically a proxy of desired properties for a network domain. Although many variables may be of interest while evaluating a routing result, such as network risk, maximum latency, minimum link availability, there is only one utility function that can be optimized for each experiment. Therefore some tradeoffs have to be made among these variables, such as assigning different weights to different variables, or adding extra penalty terms only if some variables go beyond some given thresholds. Still, the selection of weights and thresholds is problem-dependent.

The RL agent 102 may solve the RL problem using a deep RL approach called proximal policy optimization (PPO). Although other RL approaches can also be used, such as the Reinforce algorithm and search-based methods such as coordinate ascent, simulated annealing, and regularized evolution. With PPO, the RL agent, such as RL agent 102, may approximate two functions including a value function and a policy function. Each function may be represented as a neural network. The value function may map each state to a predicted value, which is the predicted future discounted reward when the RL agent 102 starts from this state and takes its current policy. The policy maps each state into a distribution over actions.

Figure 6:
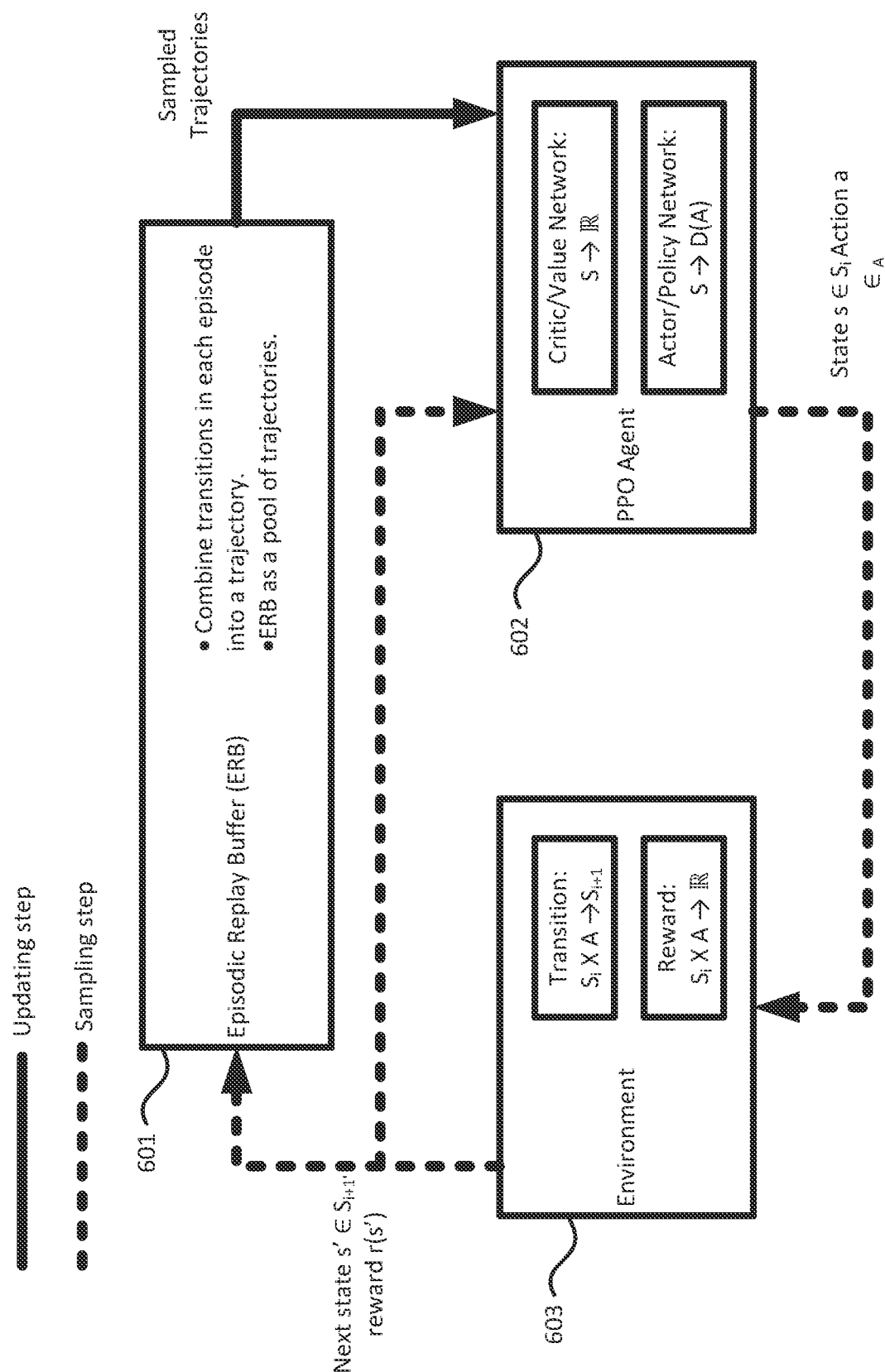
FIG. 6 is an illustration of a proximal policy optimization (PPO) according to aspects of the disclosure.

An illustrative block diagram of the algorithm is shown in FIG. 6. Each iteration of the training process contains two steps including a sampling step followed by an updating step. In the sampling step, the RL agent, labeled PPO Agent 602, which may be compared with RL agent 102 and agent 402, may interact with the environment by taking its policy to generate new IGP metric samples. The samples are saved in an episodic replay buffer (ERB) 601, which may be considered a queue of some fixed size. Since IGP metrics are generated in multiple steps, each IGP metric may be interpreted as a trajectory in the ERB. Each trajectory is composed of a sequence of transitions, where each transition, at a time 't', includes the state before the transition ($s_t$), the action that is taken ($a_t$), the next state ($s_t+1$), and the reward received for this transition ($r_t$). The trajectory is the basic unit that can be sampled from the ERB. In other words, transitions corresponding to the same IGP metric can only be sampled at the same time from the ERB.

In the updating step, the RL agent 602 may randomly sample a certain number of trajectories from the ERB and use the trajectories to update both the value network and the policy network. Training may be done by gradient descent.

The algorithm may terminate either after a given number of iterations, or when the RL agent fails to make enough progress in the last given number of iterations.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method for determining interior gateway protocol (IGP) metrics for a network domain, comprising:
    receiving, by one or more processors, a topology (G) of a network, wherein the topology G equals (V, E), where V is a set of nodes on the domain network and E is the set of edges between each node in the set of nodes on the domain network;
    generating, by the one or more processors, for each edge in the set of edges, an IGP metric;
    determining, by a routing simulator, a network utility for each failure state in the set of edges E;
    receiving, by the one or more processors, an objective function;
    determining, by the one or more processors, updated IGP metrics for each edge in the set of edges based on the optimization of the objective function and the network utility of each failure state; and
    assigning, by the one or more processors, routing paths between nodes on the network based on the updated IGP metrics.

2. The method of claim 1, wherein determining the updated IGP metrics further includes optimizing, by the one or more processors using reinforcement learning, the objective function based on the received topology and one or more flows F.

3. The method of claim 2, wherein each of the one or more flows F equals {f_j}, j=1 ... |F|, where j is the index of the flow and each flow f_j is a tuple comprising (src_j, dst_j, demand_j, SLO_j), where src_j and dst_j are the source and destination node, respectively, demand_j is the size of the flow, and SLO_j is the service level objective (SLO) requirement for the flow.

4. The method of claim 1, further comprising updating the IGP metrics for the network domain with the updated IGP metrics.

5. The method of claim 1, wherein the network utility of each failure state includes how much flow is unrouted at said failure state.

6. The method of claim 1, wherein the network utility of each failure state includes how much flow will be dropped shortly after the failure state occurs.

7. The method of claim 1, wherein the network utility of each failure state includes how much flow will violate a routing policy shortly after the failure state occurs.

8. A system comprising:
    one or more processors configured to:
    receive a topology (G) of a network, wherein the topology G equals (V, E), where V is a set of nodes on the domain network and E is the set of edges between each node in the set of nodes on the domain network;
    generate, for each edge in the set of edges, an IGP metric;
    determine a network utility for each failure state in the set of edges E;
    receive an objective function;
    determine updated IGP metrics for each edge in the set of edges based on the optimization of the objective function and the network utility of each failure state; and
    assign routing paths between nodes on the network based on the updated IGP metrics.

9. The system of claim 8, wherein determining the updated IGP metrics further includes optimizing, using reinforcement learning, the objective function based on the received topology and one or more flows F.

10. The system of claim 9, wherein each of one or more flows F equals {f_j}, j=1 ... |F|, where j is the index of the flow and each flow f_j is a tuple comprising (src_j, dst_j, demand_j, SLO_j), where src_j and dst_j are the source and destination node, respectively, demand_j is the size of the flow, and SLO_j is the service level objective (SLO) requirement for the flow.

11. The system of claim 8, wherein the one or more processors are further configured to update the IGP metrics for the network domain with the updated IGP metrics.

12. The system of claim 8, wherein the network utility of each failure state includes how much flow is unrouted at said failure state.

13. The system of claim 8, wherein the network utility of each failure state includes how much flow will be dropped shortly after the failure state occurs.

14. The system of claim 8, wherein the network utility of each failure state includes how much flow will violate a routing policy shortly after the failure state occurs.

15. A non-transitory computer readable medium storing instruction, that when executed by one or more processors, cause the one or more processors to:
    receive a topology (G) of a network, wherein the topology G equals (V, E), where V is a set of nodes on the domain network and E is the set of edges between each node in the set of nodes on the domain network;
    generate, for each edge in the set of edges, an IGP metric;
    determine a network utility for each failure state in the set of edges E;
    receive an objective function;
    determine updated IGP metrics for each edge in the set of edges based on the optimization of the objective function and the network utility of each failure state; and
    assign routing paths between nodes on the network based on the updated IGP metrics.

16. The non-transitory computer readable medium of claim 15, wherein determining the updated IGP metrics further includes optimizing, using reinforcement learning, the objective function based on the received topology and one or more flows F.

17. The non-transitory computer readable medium of claim 16, wherein each of one or more flows F equals {f_j}, j=1 ... |F|, where j is the index of the flow and each flow f_j is a tuple comprising (src_j, dst_j, demand_j, SLO_j), where src_j and dst_j are the source and destination node, respectively, demand_j is the size of the flow, and SLO_j is the service level objective (SLO) requirement for the flow.

18. The non-transitory computer readable medium of claim 15, wherein the network utility of each failure state includes how much flow is unrouted at said failure state.

19. The non-transitory computer readable medium of claim 15, wherein the network utility of each failure state includes how much flow will be dropped shortly after the failure state occurs.

20. The non-transitory computer readable medium of claim 15, wherein the network utility of each failure state includes how much flow will violate a routing policy shortly after the failure state occurs.

\* \* \* \* \*